United States Patent [19]

Bainbridge et al.

[11] Patent Number: 4,937,002
[45] Date of Patent: Jun. 26, 1990

[54] INTERPOLYMERS FOR BARIUM SULPHATE INHIBITION

[75] Inventors: Peter Bainbridge, Stefen Hill, Daventry; Vincent Rowan, Rugby, Warwickshire, both of United Kingdom

[73] Assignee: National Starch and Chemical Investment Holding Corporation, Wilmington, Del.

[21] Appl. No.: 365,074

[22] Filed: Jun. 12, 1989

[51] Int. Cl.$^5$ .............................................. C02F 5/10
[52] U.S. Cl. ................................... 210/701; 210/698; 252/180; 252/8.554; 166/244.1
[58] Field of Search ........................ 166/244.1; 210/698–701; 252/8.554, 180, 181

[56] References Cited

U.S. PATENT DOCUMENTS

| | | | |
|---|---|---|---|
| 3,682,224 | 8/1972 | Bleyle | 159/47 R |
| 3,806,367 | 4/1974 | Lange et al. | 210/701 |
| 3,806,451 | 4/1974 | Tate | 210/58 |
| 3,879,288 | 4/1975 | Siegele | 210/58 |
| 3,880,765 | 4/1975 | Watson | 252/8.55 D |
| 3,962,110 | 6/1976 | Tate | 252/181 |
| 4,029,577 | 6/1977 | Godlewski et al. | 210/701 |
| 4,126,549 | 11/1978 | Jones et al. | 210/701 |
| 4,288,333 | 9/1981 | van Zon et al. | 252/8.55 D |
| 4,331,792 | 5/1982 | Goretta et al. | 526/229 |
| 4,361,492 | 11/1982 | Dubin | 252/175 |
| 4,519,920 | 5/1985 | Fukumoto et al. | 210/701 |
| 4,530,766 | 7/1985 | Hann et al. | 210/701 |
| 4,532,048 | 7/1985 | Amjad et al. | 210/701 |
| 4,581,145 | 4/1986 | Cuisia et al. | 210/699 |
| 4,590,996 | 5/1986 | Hoskin et al. | 166/244.1 |
| 4,676,911 | 6/1987 | Fong | 210/701 |
| 4,681,686 | 7/1987 | Richardson et al. | 210/699 |
| 4,707,271 | 11/1987 | Amjad et al. | 210/701 |
| 4,710,303 | 12/1987 | Emmons | 210/698 |
| 4,710,537 | 12/1987 | Walinsky | 210/701 |
| 4,762,621 | 8/1988 | Masler et al. | 210/701 |
| 4,800,164 | 2/1977 | Watson et al. | 252/8.55 B |

FOREIGN PATENT DOCUMENTS

| | | |
|---|---|---|
| 1148438 | 6/1983 | Canada . |
| 0297049 | 12/1988 | European Pat. Off. . |
| 1414918 | 11/1975 | United Kingdom ............... 210/701 |
| 1458235 | 12/1976 | United Kingdom . |
| 2110659 | 6/1983 | United Kingdom . |

OTHER PUBLICATIONS

"Evaluation of Sulfonated Polymers as Scale Control Additives", I. Woerner and R. Holzer, 42nd Annual Mtg. International Water Conference, Pittsburgh, 1981.
"Prediction of Deposition of Calcium Sulfate Scale Under Down-Hole Conditions", O. Vetter and R. Phillips, J. of Petroleum Tech., Oct. 1970.
"Crystal Habit Modification by Water Soluble Polymers", J. of Crystal Growth 25/25 (1974), pp. 338–341.
"Prediction of Deposition of Calcium Sulfate Under Down-Hole Conditions", Vetter et al., Journal of Petroleum Technology, Oct. 1970, pp. 1299–1308.
Ostroff, A. G., "Introduction to Oilfield Water Technology", pp. 66–72.
Garrison, J. R., "Oilfield Water Systems", Campbell Petroleum Series, 1977, pp. 54–60; 69–70; 76–81.

Primary Examiner—Peter Hruskoci
Attorney, Agent, or Firm—Ellen T. Dec; Edwin M. Szala

[57] ABSTRACT

The present invention provides a method for treating aqueous systems to reduce or prevent the deposition of barium sulphate and other insoluble sulphates therein, comprising the addition to the water of an effective amount of an interpolymer of an ethylenically polymerizable carboxylic acid, and at least one of an ethylenically polymerizable dicarboxylic acid or other copolymerizable comonomer. The polymers are particularly effective in preventing scale precipitate at high levels of barium (e.g. 700 ppm) and under low pH conditions.

5 Claims, No Drawings

INTERPOLYMERS FOR BARIUM SULPHATE INHIBITION

Resevoir pressure in production oil wells is often maintained by injecting water into the wells, in many cases using an adjacent injection well. In off-shore operations, the injection water is usually sea water which has a relatively high concentration of sulphate ions.

Water may also be found in oil bearing strata together with the oil. The composition of this water (formation water) is different from the injection water and in many cases contains varying levels of barium and strontium ions. Levels of barium and strontium which occur in formation water can vary from a few ppm to thousands of ppm. The potential for forming highly insoluble barium and strontium sulphate by the mixing of the injection water and formation water is therefore very great and increases as the pH of the final system decreases.

The formation of barium and strontium sulphate in production equipment and down hole leading to blockage of oil bearing strata or of pipes and equipment can be a serious problem if not prevented.

In most cases the formation of barium sulphate and strontium sulphate can be prevented by treating the injection water with a suitable scale inhibitor. Various compounds are used for this purpose, the most popular of which are currently polymers derived from acrylic acid, or organic phosphonates or phosphate esters as described in G.B. Patent 1,458,235 and European Patent 0.150,706. While these compounds are relatively effective at pH values of 6 and above, as the pH of the system decreases, and the level of barium and strontium increases, prevention of sulphate scale formation becomes increasingly difficult, and many of these hitherto effective inhibitors become less effective.

U.S. Pat. No. 4,710,303 claims the use of polyvinyl sulphonate to prevent the formation of barium sulphate scale at low pH, however, the levels of barium described are low.

There is thus a need for a scale inhibitor which would provide increased inhibition of sulphate scales even at low pH's and at relatively high levels of barium ion (e.g. about 700 ppm). Such polymers would also find use as anti-scalants in other water recirculating systems, for example boilers or cooling towers where scales such as calcium carbonate and calcium sulphate are formed.

Accordingly, the present invention provides a method for treating aqueous systems to reduce or prevent the deposition of barium sulphate and other insoluble sulphates therein, comprising the addition to the water of an effective amount of an interpolymer of an ethylenically polymerizable carboxylic acid, and at least one of an ethylenically polymerizable dicarboxylic acid or other copolymerizable comonomer. The polymers are particularly effective in preventing scale precipitate at high levels of barium (e.g. 700 ppm) and under low pH conditions.

Thus, the polymers used herein are those consisting essentially of:
(i) from about 25 to 90 mole % of the ethylenically polymerizable carboxylic acid; and
(ii) 10 to 75 mole % of at least one copolymerizable comonomer
selected from the group consisting of the ethylenically polymerizable dicarboxylic acids having 4 to 6 carbon atoms, a hydroxyalkyl ($C_1$ to $C_4$) acrylate or methacrylate, esters of ethylenically polymerizable mono or dicarboxylic acids, acrylamide and its derivatives, allyl alcohol, vinyl esters, vinyl alcohol, vinyl ethers and styrene. The useful polymers are prepared at molecular weights (Mw) (as determined by gel permeation chromatography) varying from 500 to 100,000, preferably 1000 to 20,000 and most preferably 1000 to 10,000.

Suitable ethylenically polymerizable carboxylic acids are the alkenoic acids having from 3 to 6 carbon atoms such as acrylic, methacrylic and crotonic acid, preferably acrylic acid or methacrylic acid.

Suitable copolymerizable comonomers include the ethylenically polymerizable dicarboxylic acids such as alkenedioic acids having 4 to 6 carbon atoms, preferably maleic, fumaric and itaconic acids. Alternately, the copolymerizable comonomer may be a hydroxyalkyl ($C_1$ to $C_4$) acrylate or methacrylate, e.g. hydroxyethylacrylate or hydroxyethylmethacrylate; an ester of an ethylenically polymerizable mono or di-carboxylic acid, e.g. methyl methacrylate, monomethyl maleate, monoethyl maleate; acrylamide and its derivatives; allyl alcohol; vinyl esters such as vinyl acetate or vinyl propionate, vinyl alcohol obtained by hydrolysis of a vinyl ester based polymer; vinyl ethers; styrene; etc.

One or more of these copolymerizable comonomers may be included with preferred polymers for use herein prepared from acrylic acid, maleic acid and a hydroxyalkylacrylate, particularly hydroxyethylacrylate or hydroxypropylacrylate, or monomethyl maleate as a the third comonomer.

The interpolymers may be used as the polyacids or the water-soluble salts. The salt cations are preferably alkali metals, e.g. sodium, potassium; alkaline earth metals, e.g. calcium, magnesium; organic bases, e.g. amines and their derivatives and ammonia.

The polymers utilized in the present invention may be prepared by any number of conventional means well known to those skilled in the art. Such as solution, emulsion, suspension or precipitation polymerization in a variety of polymerizing media. Preferably, the monomers are interpolymerized in an aqueous medium in the presence of a catalyst capable of generating free radicals under the reaction conditions employed. The polymerization is performed at conventional temperatures from about 25° to 100° C. for sufficient time to achieve a low monomer content, e.g. from 0.5 to about 10 hours, preferably from 2 to about 6 hours, to produce an interpolymer having less than 1.5 percent, and preferably less than 0.5 weight percent, free monomer. Conventional batch, semi-continuous or continuous polymerization procedures may be employed.

Suitable catalysts include the free radical initiators such as water soluble peroxide, peracid or salt thereof, e.g. hydrogen peroxide, sodium peroxide, lithium peroxide, peracetic acid, persulfuric acid or the ammonium and alkali metal salts thereof, e.g. ammonium persulfate, sodium persulfate, lithium persulfate, potassium persulfate, sodium persulfate, etc. Alternatively, organic peroxides such as benzoyl peroxide, t-butyl hydroperoxide, etc. may also be employed. A suitable concentration of the initiator is from 0.05 to 10.0 weight percent and preferably from 0.1 to 5 weight percent.

The free radical initiator can be used alone and thermally decomposed to release the free radical initiating species or can be used in combination with a suitable reducing agent. The reducing agent is typically an oxidizable sulfur compound such as an alkali metal metabisulfite or pyrosulfite, e.g. sodium metabisulfite, sodium formaldehyde sulfoxylate, potassium metabisulfite, sodium pyrosulfite, etc. The amount of reducing agent which can be employed throughout the copolymerization generally varies from about 0.1 to 5 weight percent of the amount of polymer. The molecular weights of the polymers may be controlled by various compounds in the art including, for example chain transfer agents such as mercaptans, secondary alcohols (preferably isopropanol). In a preferred embodiment the polymerization method system comprises tertiary butyl hydroperoxide and sodium formaldehyde sulphoxylate.

As indicated above, these polymers may be used to treat aqueous production or injection fluids over a wide range of pH values; however, they are most effective in comparison with prior art polymers when used on aqueous fluids at pH values above about 4 and as high as about 7.

The amount of polymer required to effect good barium sulfate scale control should be at least 0.5 ppm based on the weight of the aqueous produced or injection fluid treated. Typical dosage ranges are between 1-500 ppm with a preferred dosage range being at least 20-300 ppm.

While any number of known methods may be used to prepare interpolymers used herein, a typical preparation is presented below as Example 1.

EXAMPLE 1

A 51:34:15 mole percent composition of acrylic acid:-maleic acid:hydroxypropylacrylate was prepared using the following procedure:

A two liter reaction flask was equipped with a mechanical stirrer, thermometer and condenser. The flask was charged with deionized water (300 g), maleic anhydride (196 g) and isopropanol (50 g), and then stirred to dissolve the maleic anhydride. Sodium hydroxide (72 g) was dissolved in deionized water (200 g) and added to the flask contents. The contents were heated to 85° C.

A monomer solution of acrylic acid (216 g) and hydroxypropylacrylate (112 g) and catalyst solutions of tertiary butyl hydroperoxide (32.0 g of 70% w/w solution) in deionized water (80 g), and sodium formaldehyde sulphoxylate (22.4 g) in deionized water (100.0 g) were added simultaneously to the reaction flask over three hours. The contents were held at 85° C. for one hour.

Isopropanol-water azeotrope (125 g) was then removed under vacuum. The contents were cooled and sodium hydroxide (172 g) in deionized water (358 g) were added to the flask maintaining the temperature below 45° C. A yield of 1785 g of 40% w/w actives polymer content was obtained.

The polymer was characterized using Gel Permeation Chromatography, and gave molecular weight parameters of Mw: 2800 and Mn: 1000 with respect to sodium polyacrylate standards.

Using a similar procedure, varying the amounts of the monomeric components, other polymers as described below were prepared where AA is acrylic acid; MA is maleic acid; HPA is hydroxypropylacrylate; MMM is monomethyl maleate.

| INTERPOLYMER COMPOSITION (mole %) | | | | |
|---|---|---|---|---|
| Polymer | | | Mw | Mn |
| A | 51:34:15 | AA:MA:HPA | 2150 | 800 |
| B | 46:31:23 | AA:MA:HPA | 8100 | 1700 |
| C | 61:25:14 | AA:MA:HPA | 3200 | 810 |
| D | 87.5:0:12.5 | AA:—:MMM | 4000 | 1150 |

| -continued | | | | |
|---|---|---|---|---|
| INTERPOLYMER COMPOSITION (mole %) | | | | |
| Polymer | | | Mw | Mn |
| E | 60:40:0 | AA:MA:— | 1530 | 500 |

BaSO4 INHIBITION TEST

The interpolymers produced by the method described above were tested in a static bottle test carried out in the following manner.

Two waters representing formation water and sea water were made up to the following compositions:

| FORMATION WATER (A) | (g/liter) |
|---|---|
| NaCl | 66 |
| KCl | 2 |
| $CaCl_2.2H_2O$ | 1.172 |
| $MgCl_2.6H_2O$ | 0.36 |
| $BaCl_2.2H_2O$ | 1.36 |
| $SrCl_2.6H_2O$ | 0.1 |
| $NaHCO_3$ | 4.02 |

| SEA WATER (B) | (g/liter) |
|---|---|
| NaCl | 30.95 |
| KCl | 0.706 |
| $CaCl_2.2H_2O$ | 1.464 |
| $MgCl_2.6H_2O$ | 11.71 |
| $Na_2SO_4$ | 3.99 |

1. Add required amount of interpolymer inhibitor to 100 ml bottle.
2. Add 90 ml of formation water. Shake well.
3. Add 10 ml of sea water to bottle, cap, and shake well.
4. Adjust pH of solution to 4.7 using HCl.
5. Place bottle in oven at 90° C. for 16 hours.
6. Remove bottle from oven, filter solution through 0.45u filter and analyze filtrate for soluble barium.

$$\% \text{ Inhibition} = \frac{\text{Weight Ba++ in sample} - \text{blank} \times 100}{\text{Max. Ba++} - \text{blank}}$$

Blank = No interpolymer

CALCIUM CARBONATE INHIBITION TEST

Two waters were made up as follows:
Water A: 0.7344 g/l $CaCl_2 2H_2O$; 30 g/l NaCl
Water B: 0.5295 g/l $Na_2CO_3$; 30 g/l NaCl

PROCEDURE

1. Add required amount of interpolymer to 100 ml bottle.
2. Add 50 ml of Water A to bottle, cap, and shake.
3. Add 50 ml of Water B to bottle, cap, and shake.
4. Place bottle in oven at 85° C. for 16 hours.
5. Remove bottle from oven, filter solution through 0.45u filter and analyze filtrate for soluble calcium.

CALCULATION $$\% \text{ Inhibition} = \frac{\text{Weight Ca++ in sample} - \text{blank} \times 100}{\text{Max. Ca++} - \text{blank}}$$

Blank = No interpolymer

CALCIUM SULPHATE INHIBITION TEST

Two waters were made up as follows:
Water A: 25.912 g $CaCl_3 2H_2O$/liter

Water B: 25.057 g Na$_2$SO$_4$/liter

PROCEDURE

1. Add required amount of interpolymer to 100 ml bottle.
2. Add 50 ml Water A to bottle, cap, and shake.
3. Add 50 ml Water B to bottle, cap, and shake.
4. Place bottle in oven at 49° C. for 16 hours.
5. Remove bottle from oven, filter solution through 0.45u filter and analyze filtrate for soluble calcium.

$$\% \text{ Inhibition} = \frac{\text{Weight Ca}^{++} \text{ in sample} - \text{blank}}{\text{Max. Ca}^{++} - \text{blank}} \times 100$$

Blank = No interpolymer

The polymers described in Example I were then tested in accordance with the above procedures and the results are shown in Tables 1, 2 and 3.

TABLE 1

| | BARIUM SULPHATE INHIBITION | | | | |
|---|---|---|---|---|---|
| | TURBIDITY (N.T.U's) | | INHIBITION % | | |
| | M.B.F.W. | N.S.W. | 23° C. | | 90° C. |
| Polymer/DOSE (ppm) | 200 | 200 | 50 | 35 | 50 |
| A | 7 | 2 | 47 | 78 | 100 |
| B | 30 | 25 | 23 | 38 | 38 |
| C | 10 | 5 | 16 | 62 | 87 |
| D | 10 | 7 | 70 | 91 | 100 |
| E | 57 | 41 | 89 | 93 | 97 |
| F (Control) | 2 | 2 | 12 | 20 | 51 |
| G (Control) | 2 | 2 | 4 | 4 | 13 |

M.B.F.W. = Marathon Brae Formation Water
Ratio 90 Formation Water
10 North Sea Water
N.S.W. = North Sea Water
Product F = Polyacrylic acid homopolymer
Product G = H.E.D.P. = 1-Hydroxyethylidene-1, 1-Diphosphonic acid (as described in G.B. Patent 1,458,235).
Ageing Time 16 hours pH 4.7

TABLE 2

| | % CALCIUM CARBONATE INHIBITION | |
|---|---|---|
| | Dose | |
| | 2.5 ppm | 5 ppm |
| A | 79 | 100 |
| B | 56 | 79 |
| C | 83 | 100 |
| D | 76 | 100 |
| E | 100 | 100 |

TABLE 3

| | % CALCIUM SULPHATE INHIBITION |
|---|---|
| | Dose |
| Product | 4 ppm |
| Product A | 92 |
| Product D | 90 |
| Product E | 93 |
| Product F | 97 |
| Product G | 69 |

In the above example, the turbidity indirectly measures the polymer solubility with a higher turbidity number indicating a less soluble polymer.

Thus, the results of Table I show that Product A has low turbidity values in both formation water and sea water combined with excellent barium sufate inhibition. Product E, although very good in barium sulfate inhibition, exhibits an unacceptable degree of insolubility for many applications in brine but could be used in other systems for its inhibition properties.

Control products F and G, although very stable, exhibit inadequate inhibition performance. Product D has excellent inhibition performance and its level of solubility may be acceptable in some cases.

Table 2 indicates that most of the products have good calcium carbonate inhibition properties.

Table 3 indicates that most of the products have good calcium sulphate inhibition.

Similar results would be achieved using other polymeric compositions utilizing the various ethylenically polymerizable carboxylic acids and copolymerizable comonomers falling within the scope of the invention.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

What is claimed is:

1. A method for inhibiting the precipitation of barium and other sulfate scales in aqueous injection or production fluids having a pH of 7 or less and which are recovered from underground formations, which method comprises the step of treating the aqueous fluid with 1-500 ppm, by weight, of a polymer consisting essentially of
   (i) from about 50 to 90 mole % of acrylic acid; and
   (ii) 10 to 50 mole % of at least one copolymerizable comonomer;
wherein said polymer consists essentially of acrylic acid, maleic acid and hydroxyalkyl (C1 to C$_4$) acrylate, wherein the amount of maleic acid in said polymer is not greater than 34 mole %, or said polymer consists essentially of acrylic acid and mono-methylmaleate; said polymer having a molecular weight of 500 to 10,000 (Mw).

2. The method of claim 1 wherein the polymer consists essentially of acrylic acid, maleic acid and hydroxyethylacrylate.

3. The method of claim 1, wherein the polymer consists essentially of acrylic acid, maleic acid and hydroxypropylacrylate.

4. The method of claim 1 wherein the polymer consists essentially of acrylic acid and mono-methylmaleate.

5. The method of claim 1 wherein the polymer has a molecular weight of 1000 to 10,000 (Mw).

* * * * *